United States Patent
Takeuchi et al.

(10) Patent No.: US 10,824,668 B2
(45) Date of Patent: Nov. 3, 2020

(54) INFORMATION PROCESSING SERVER, CLIENT, AND INFORMATION PROCESSING SYSTEM

(71) Applicant: HONDA MOTOR CO., LTD., Tokyo (JP)

(72) Inventors: Yuji Takeuchi, Tokyo (JP); Koji Sengoku, Tokyo (JP); Takamichi Shimada, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 272 days.

(21) Appl. No.: 15/895,368

(22) Filed: Feb. 13, 2018

(65) Prior Publication Data

US 2018/0232369 A1    Aug. 16, 2018

(30) Foreign Application Priority Data

Feb. 14, 2017 (JP) .................................. 2017-025463

(51) Int. Cl.
*G06F 16/51* (2019.01)
*G06F 16/54* (2019.01)

(52) U.S. Cl.
CPC .............. *G06F 16/51* (2019.01); *G06F 16/54* (2019.01)

(58) Field of Classification Search
None
See application file for complete search history.

(56) References Cited

U.S. PATENT DOCUMENTS

| 2014/0232872 A1* | 8/2014 | Kussel | ...................... | B60R 1/00 |
| | | | | 348/148 |
| 2014/0313330 A1* | 10/2014 | Carey | ................ | G06K 9/00778 |
| | | | | 348/143 |
| 2017/0212910 A1* | 7/2017 | Morris | ................ | G06F 16/5838 |
| 2018/0192446 A1* | 7/2018 | Skobov | ................. | H04W 76/10 |

FOREIGN PATENT DOCUMENTS

| JP | 2011-118647 A | 6/2011 |
| JP | 2011-118648 A | 6/2011 |
| JP | 2011-118649 A | 6/2011 |

* cited by examiner

*Primary Examiner* — Wilson Lee
(74) *Attorney, Agent, or Firm* — Squire Patton Boggs (US) LLP (57) ABSTRACT

An information processing server and the like are provided that can generate information in a more meaningful manner for a user on the basis of multiple images taken by a client. In response to a start of an ON period of a mobile station X, the taken image registered in a client 2 and "designated point" are associated with each other, are transmitted to an information processing server 1, and registered in a database 10. An editing policy is determined on the basis of the image registered in the database 10, or the editing policy is designated in the client 2. The images taken in a travel period of the client 2 and registered in the database 10 are edited according to the editing policy, thereby generating an "image library" in the travel period.

12 Claims, 8 Drawing Sheets

INFORMATION PROCESSING SERVER, CLIENT, AND INFORMATION PROCESSING SYSTEM

BACKGROUND OF THE INVENTION

Field of the Invention

The present invention relates to a technique for processing pieces of information collected from clients which are multiple mobile stations.

Description of the Related Art

Information processing techniques have been proposed that define stay intervals and mobile intervals separately from each other on the temporal axis on the basis of a position history of a vehicle, determine and select the number of photographs to be displayed on an interval-by-interval basis, arrange the selected photographs in a time series sequence, and create and display slide show (see Japanese Patent Laid-Open Nos. 2011-118647, 2011-118648 and 2011-118649). The photographs are classified into, for example, portrait photographs (photographs with faces detected) and non-portrait photographs, and the numbers of photographs belonging to the respective classifications are adjusted.

It is often a case that photographs contained in the slide show include an unexpected number of photographs against a user's taste.

SUMMARY OF THE INVENTION

The present invention has an object to provide an information processing server and the like that can generate information in a more meaningful manner for the user on the basis of multiple images taken by a client.

An information processing server according to the present invention comprises: a database; an image registration unit configured to obtain an image taken by a client having a function of communicating with a mobile station and registered in the client in response to a start of an OFF period of the mobile station, the image being obtained in response to a start of an ON period of the mobile station immediately after the OFF period, and to cause the database to store and hold the image; an editing policy recognition unit configured to determine an editing policy, based on an image taken by the client in a travel period of the client and stored and held in the database, or to recognize an editing policy designated through the client; and an image library generation unit configured to generate an image library in the travel period by editing the image taken through the client in the travel period of the client and stored and held in the database, according to the editing policy obtained by the editing policy recognition unit.

A client according to the present invention comprises: an imaging device; a storing device; an input device; an output device; and an information processing unit, the client having a function of communicating with each of a mobile station and an information processing server, wherein the information processing unit registers an image taken by the imaging device in the storing device in response to a start of an OFF period of the mobile station, and causes the information processing server to register the image registered in the storing device in response to a start of an ON period of the mobile station subsequent to the OFF period, and the output device displays an image library that is generated by editing the image registered in the information processing server and is in a travel period of the client.

The information processing server, the client, and the information processing system including these server and client according to the present invention register the image taken by the client into the client according to the start of OFF period of the mobile station (ON→OFF switching of the mobile station) whose communication with the client is established. Subsequently, the registered taken image is transmitted to the information processing server in response to the start of the ON period of the mobile station (OFF→ON switching of the mobile station), and is registered in the database of the information processing server.

The images taken in the travel period of the client and registered in the database of the information processing server are edited according to the editing policy, thereby generating an "image library" in the travel period. The image library is output through the client or another terminal. The "editing policy" is determined on the basis of the image stored and held in the database, or is designated through the client. Consequently, the image library is generated in a form conforming to the user's preference reflected indirectly in the group of images taken in the travel period by the user using the imaging device of the client, or the user's preference reflected directly in the content designated through the client by the user. Accordingly, in a scene where events in the travel period are reviewed, the usability of the image library for the user is facilitated.

DETAILED DESCRIPTION OF THE PREFERRED EMBODIMENTS (Configuration)

Figure 1:
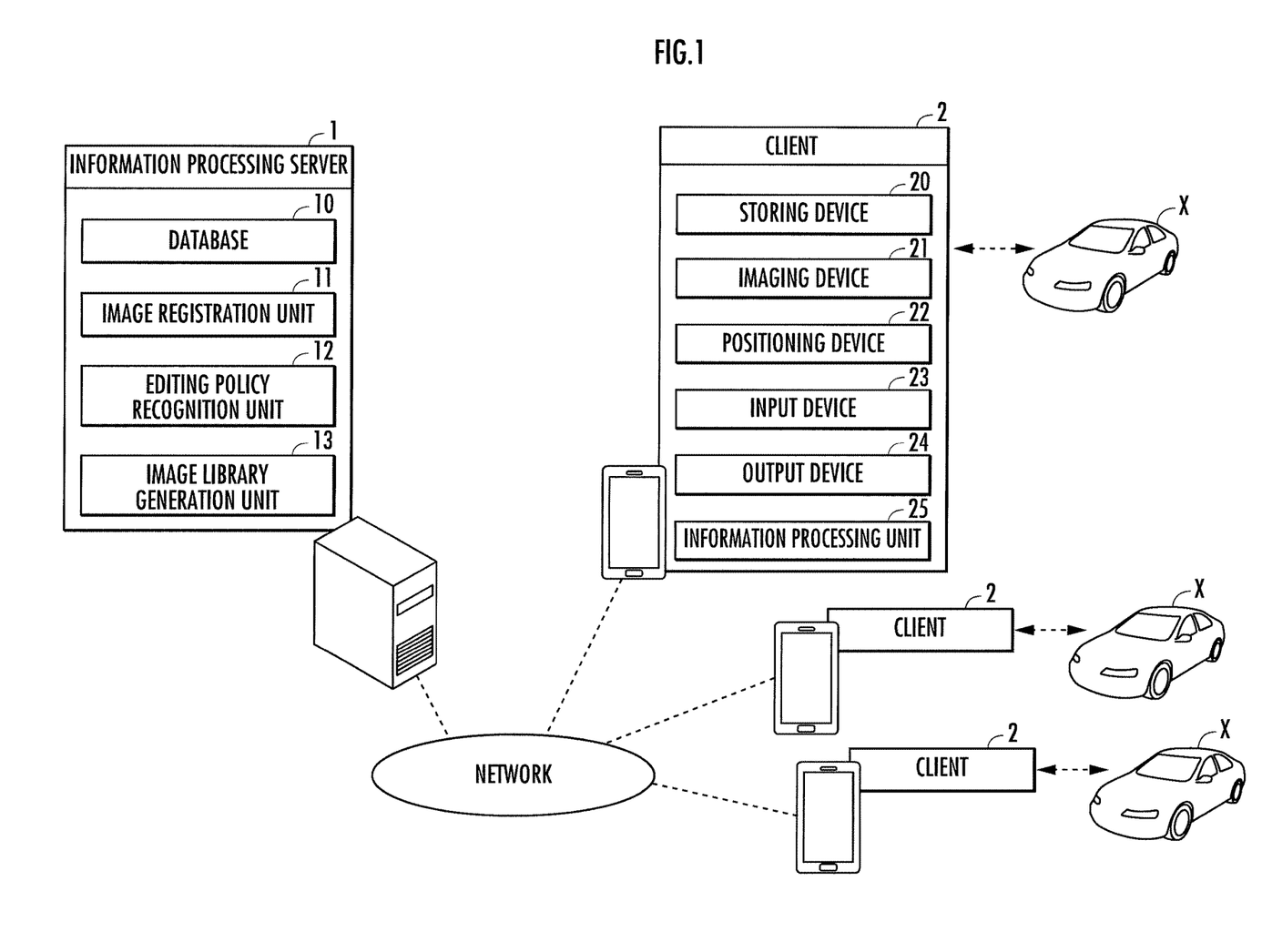
FIG. 1 is a diagram illustrating a configuration of an information processing system as one embodiment of the present invention.

An information processing system which is an embodiment of the present invention shown in FIG. 1 includes an information processing server 1, and multiple clients 2. The information processing server 1 and the clients 2 can communicate with each other via a network. The clients 2 have a function of communicating with a mobile station X, such as any of a four-wheel automobile, a two-wheel automobile, and bicycles, which has a function of moving according to a user's driving operation.

(Configuration of Information Processing Server)

The information processing server 1 includes a database 10, an image registration unit 11, an editing policy recognition unit 12, and an image library generation unit 13. The information processing server 1 may be made up of a mobile terminal device, such as a smartphone or a tablet.

The database 10 stores and holds not only images uploaded from the clients 2 to the information processing server 1 but also an editing policy recognized by the editing policy recognition unit 12 and an image library generated by the image library generation unit 13. Furthermore, the database 10 stores and holds road traffic information and map information. The "road traffic information" contains a travel cost at each link. The "map information" contains not only a string of coordinate values ((latitude, longitude) or (latitude, longitude, altitude)) of the position, shape, orientation and the like of each of links that constitute roads, but also link identification information for identifying each link, and data representing the attributes. The links are connected to each other by nodes. The database 10 may be made up of a database server separated from the information processing server 1.

The image registration unit 11, the editing policy recognition unit 12, and the image library generation unit 13 are each made up of an information processing unit (CPU) that reads required software and data from a memory, and executes a designated operation process for the data as a target according to the software, and, if required, a communication device, a storing device (the memory concerned), etc. The details of this designated operation process are described later.

(Configuration of Client)

The client 2 is made up of a mobile terminal device, such as a smartphone or a tablet. The term "mobile" means that, for example, the size is about a standard-sized palm of a person, and the weight is to an extent allowing easy portable use with a single hand or in a pocket of clothes. The client 2 may be made up of an apparatus that has a larger size and a heavier weight than a mobile apparatus does (for example, a device assembled in a mobile station).

The client 2 includes a storing device 20, an imaging device 21, a positioning device 22, an input device 23, an output device 24, and an information processing unit 25.

The storing device 20 is configured to store and hold an operation process result by the information processing unit 25 and the like. The storing device 20 is configured to store map information. The "map information" contains coordinate strings that represent the position, shape, orientation, etc. of each of the links constituting the roads, and link identification information for identifying each link.

The imaging device 21 takes an image of an object around the client 2 by an operation through the input device 23. The positioning device 22 measures the presence position (latitude and longitude) of the client 2 using a GPS function at constant intervals. The input device 23 includes operation buttons and a microphone, and allows various operations or input settings through the user's operation or speech. The output device 24 includes a display device or an audio output device (loudspeaker), and displays image content, such as client map information, or outputs audio content. The term "output" means output of information in any of modes including displaying of the information, audio output, vibration output, which are recognizable through five senses, such as senses of vision, hearing and touch. The input device 23 and the output device 24 may be made up of a touch panel display.

The information processing unit 25 is made up of an information processing unit (CPU) that reads software and data from a designated area in a memory constituting the storing device 20, as required, and then executes a designated operation process for the data as a target according to the software, and, if required, of a communication device, a storing device (the memory concerned), etc. The details of this designated operation process are described later.

(Functions)

The functions of the aforementioned configuration are described.

Figure 2:
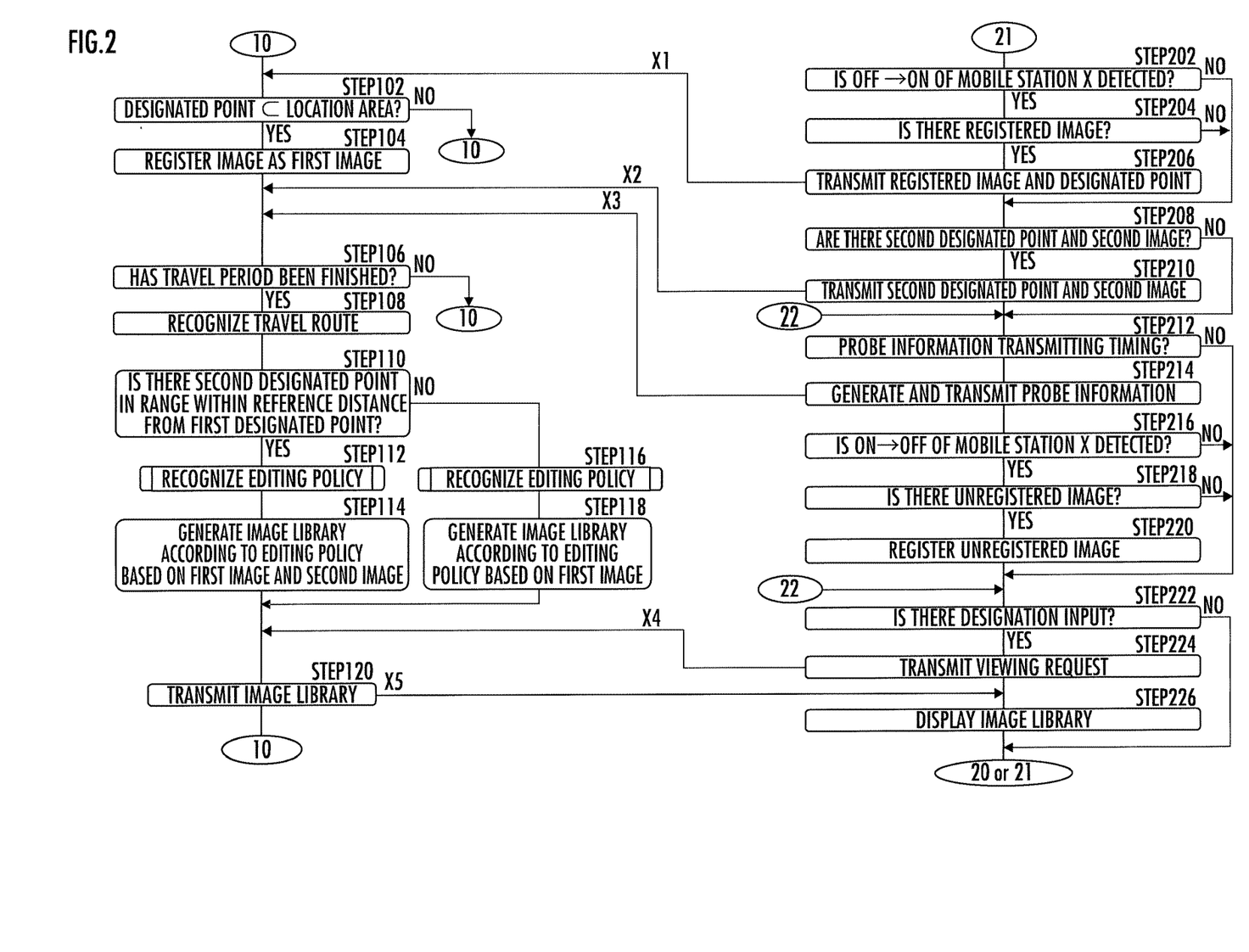
FIG. 2 is a diagram illustrating functions of the information processing system as one embodiment of the present invention.

In the client 2, the information processing unit 25 determines whether the mobile station X has been switched from OFF to ON or not (whether the ON period this time has been started or not) (FIG. 2, STEP 202). The distinction between ON and OFF of the mobile station X (e.g., ON and OFF of an IGN switch) is detected on the basis of communication with a device mounted on the mobile station X.

If it is determined that the mobile station X has been switched from OFF to ON (FIG. 2, STEP 202 . . . YES), the information processing unit 25 determines presence or absence of the image registered in the storing device 20 (FIG. 2, STEP 204). The image (a still image, a moving image, or a combination of these images) is an image taken by the imaging device 21 and registered as a target to be transmitted (or uploaded) to the information processing server 1 in response to the start of the next ON period as described later.

If it is determined that there is the image registered in the storing device 20 (FIG. 2, STEP 206 . . . YES), the information processing unit 25 transmits the image together with the designated point to the information processing server 1 (FIG. 2, STEP 206 and an arrow X1). The "designated point" is the presence point of the client 2 or the imaging point of each image at the end time point of the last ON period of the mobile station X or the start time point of the ON period at this time (the presence point of the client 2 at the imaging time point of each image by the imaging device 21), and is measured by the positioning device 22. If there is not any image registered in the storing device 20 (an image having not been uploaded to the information processing server 1) (FIG. 2, STEP 206 . . . NO), the processing proceeds to the next procedures with nothing unchanged.

The information processing unit 25 determines the presence or absence of a second image and a second designated point which have been registered in the storing device 20 (and have not been uploaded to the information processing server 1) (FIG. 2, STEP 208). For example, any image is directly designated as the second image through the input device 23, from among the designated points registered or stored and held in the storing device 20 or the database 10, and images corresponding to the designated points. In this case, the designated point corresponding to the second image can be determined as the second designated point in the client 2 or the information processing server 1. Any designated point may be directly designated as the second designated point. In this case, the image corresponding to the designated point can be determined as the second image in the client 2 or the information processing server 1. Each of the second image and the second designated point may be directly designated through the input device 23. The second image may be an image representing scenery at the second designated point, or an image irrespective of the scenery.

If it is determined that there is at least one of the second image and the second designated point (FIG. 2, STEP 208 . . . YES), the information processing unit 25 transmits information that indicates at least one of the second image and the second designated point to the information processing server 1 (FIG. 2, STEP 210 and an arrow X2). If it is determined that there is neither the second image nor the second designated point (FIG. 2, STEP 208 . . . NO), the processing proceeds to the next procedures.

The information processing unit 25 determines that probe information transmitting timing has been reached or not (FIG. 2, STEP 212). For example, it is determined whether a condition that a designated time has elapsed from the last transmission of the probe information, a condition that the travel distance of the mobile station after the last transmission of the probe information has reached a designated distance, or a condition that the amount of probe information has reached a predetermined amount is satisfied or not.

If it is determined that the probe information transmitting timing has been reached (FIG. 2, STEP 212 . . . YES), the information processing unit 25 generates probe information that represents the time series of positions of the mobile station X measured by the positioning device 22, and transmits this time series to the information processing server 1 (FIG. 2, STEP 214 and an arrow X3). The probe information contains identification information for identifying the client 2 or the mobile station X, or the user thereof. If it is determined that the probe information transmitting timing has not been reached (FIG. 2, STEP 212 . . . NO), the determination of presence or absence of designation input described later is executed (FIG. 2, STEP 222).

In the client 2, the information processing unit 25 determines whether the mobile station X has been switched from ON to OFF or not (whether the ON period this time has been finished or not) (FIG. 2, STEP 216).

If it is determined that the mobile station X has not been switched from ON to OFF (FIG. 2, STEP 216 . . . NO), the determination of presence or absence of designation input described later is executed (FIG. 2, STEP 222). If it is determined that the mobile station X has been switched from ON to OFF (FIG. 2, STEP 216 . . . YES), the information processing unit 25 determines the presence or absence of an unregistered image as a target image to be transmitted to the information processing server 1 in response to the start of the next ON period from among the images taken by the imaging device 21 and stored and held in the storing device 20 (FIG. 2, STEP 218).

If it is determined that there is an unregistered image (FIG. 2, STEP 218 . . . YES), the information processing unit 25 registers the unregistered image in the storing device 20 (FIG. 2, STEP 220). If it is determined that there is no unregistered image (FIG. 2, STEP 218 . . . NO), the determination of presence or absence of designation input described later is executed (FIG. 2, STEP 222).

In the information processing server 1, the image registration unit 11 receives the image and the designated point from the client 2 and then stores and holds these image and point in the database 10, and determines whether the designated point is included in "location area" or not (FIG. 2, STEP 102).

The location area is described with reference to FIG. 4. In an example shown in FIG. 4, the user of the client 2 or the mobile station X identified by the identification information usually adopts points Q0, Q1 and Q2 as stay locations, and comes and goes between the stay locations Q0 and Q1 via a route R1, and comes and goes between the stay locations Q1 and Q2 via a route R2. The image registration unit 11 (or an operation process device that constitutes this unit) accumulates the presence frequency of the mobile station X at each point on the basis of the probe information transmitted from the client 2 of the user. The presence frequency at each point at the time point of switching between the ON state and OFF state of the mobile station X is evaluated as "stay frequency". The presence frequency at each point at the time point in continuation of the ON state of the mobile station X is evaluated as "travel frequency". Accordingly, the stay frequencies at the points Q0, Q1 and Q2, and the travel frequencies at the points on the routes R1 and R2 are highly evaluated.

The image registration unit 11 designates, as a first location area, an area including a point where the stay frequency of the mobile station X is equal to or higher than a first threshold, and designates, as a second location area, an area including a point where the travel frequency of the mobile station X is equal to or higher than a second threshold. The first threshold may be set to a value lower than the second threshold.

Figure 4:
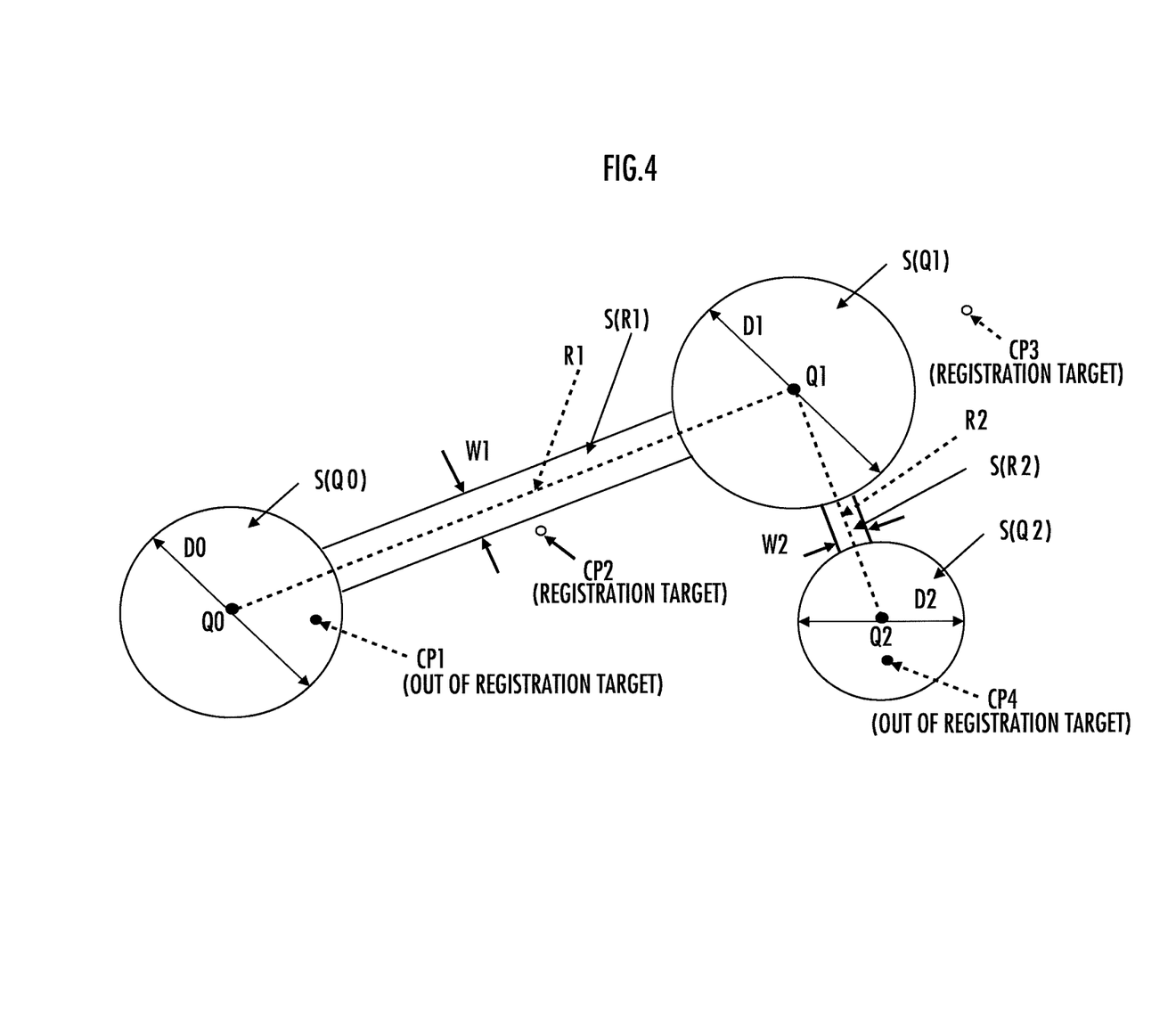
FIG. 4 is a diagram illustrating location areas.

In the example shown in FIG. 4, belt-shaped areas in which circular areas extending with reference to multiple points on the routes R1 and R2 aggregate are designated as the respective first location areas S(R1) and S(R2). Circular areas extending with reference to the stay locations Q0, Q1 and Q2 are designated as the respective second location areas S(Q0), S(Q1) and S(Q2). The first location area S(R1) has the opposite ends overlapping with the respective second location areas S(Q0) and S(Q1). The first location area S(R2) has the opposite ends overlapping with the respective second location areas S(Q1) and S(Q2).

The widths W1 and W2 of the first location areas S(R1) and S(R2) have a size relationship of W1>W2. A width size is defined according to the high and low degree of the travel frequency of the mobile station X mounted with the client 2. The shape of the area including each of passing points that constitute the first location area has not only a circular shape centered on the passing point but also a polygonal shape, such as an elliptic shape, a triangular shape, or a quadrangular shape (rectangle, trapezoid, etc.). The sizes of areas constituting the first location area (diameters in a case where the areas including the respective passing points have circular shapes) may be the same as each other.

The diameters D0, D1 and D2 of the respective second location areas S(Q0), S(Q1) and S(Q2) have a size relationship of D1>D0>D2. A diameter size is defined according to the high and low degree of the stay frequency of the mobile station X mounted with the client 2. The shape of the second location area has not only a circular shape centered on the location but also a polygonal shape, such as an elliptic shape, a triangular shape, or a quadrangular shape (rectangle, trapezoid, etc.). All the second location areas may have the same size (the same diameter in a case of circular shapes). The widths of all the first location areas may be set smaller than the diameters of all the second location areas (it may be set such that D2>W1 in this example).

The location area may be designated through the information processing unit 25 in the client 2 in an analogous view, and transmitted to the information processing server 1, thereby allowing the area to be received or recognized by the image registration unit 11. The location area may be set according to the user's intention through the input device 23 of the client 2.

If the points CP1, CP2, CP3 and CP4 shown in FIG. 4 are extracted as first designated points, it is determined that the points CP2 and CP3 are not included in any of the location areas. Meanwhile, it is determined that the points CP1 and CP4 are included in any of the location areas.

If the designated point is determined to be included in the location area (FIG. 2, STEP 102 . . . YES), the image registration unit 11 causes the database 10 to store and hold the image corresponding to this designated point as "first image" corresponding to "first designated point" (FIG. 2, STEP 104). If the designated point is determined not to be included in the location area (FIG. 2, STEP 102 . . . NO), it is subsequently determined whether the newly received designated point is included in the location area or not (FIG. 2, STEP 102). Irrespective of whether the designated point is included in the location area or not, the image may be registered as the first image in the database 10.

The image library generation unit 13 determines whether the travel period of the client 2 has been finished or not (FIG. 2, STEP 106).

For example, if the target point has been set in the client 2 through the input device 23, the image library generation unit 13 receives a target point from the client 2, and determines whether the travel period has been finished or not according to whether the last received designated point (see FIG. 2, STEP 206 and the arrow X1) is included in an adjacent range distant from the target point by a predetermined distance or less. In this case, the setting time point of the target point or the reception time point is estimated as the start time point of the travel period. Upon receipt of the target point, a server route R(1) may be calculated as described later.

If the target point is not set in the client 2, it is determined whether the travel period has been finished or not according to whether the image library generation unit 13 has received the designated point this time from the client 2 or not (see FIG. 2, STEP 206 and the arrow X1). In this case, the reception time point of the designated point last time is estimated as the start time point of the travel period.

If the travel period of the client 2 is determined not to be finished (FIG. 2, STEP 106 . . . NO), the processes in and after FIG. 2, STEP 102 are repeated. On the contrary, if the travel period of the client 2 is determined to be finished (FIG. 2, STEP 106 . . . YES), the image library generation unit 13 (or the operation process device constituting this unit) searches for or calculates the travel route R of the client 2 in this travel period (FIG. 2, STEP 108). For example, the travel route R is calculated (see FIGS. 5A and 5B), based on one or both of the designated point (see FIG. 2, STEP 206) accompanying the image transmitted from the client 2 one or more times in the travel period or the first designated point, and of the probe information (see FIG. 2, STEP 214 and the arrow X3).

The image library generation unit 13 determines the presence or absence of registration of the second designated point $Q_k$ included in the range within a reference distance $D_i$ from the first designated point $P_i$ included in the travel route R (FIG. 2, STEP 110). The second designated point $Q_k$ and the second image $H_k$ corresponding to this point are received from the client 2 by the image registration unit 11, and registered in the database 10. For example, if the distance from the first designated point $P_i$ to the second designated point $Q_k$ is within the reference distance $D_i$ shown in FIG. 6, the determination result is affirmative.

If the second designated point contained in the range within the reference distance from the first designated point is determined to be registered (FIG. 2, STEP 110 . . . YES), the editing policy recognition unit 12 recognizes an editing policy that adopts, as targets, both the first image corresponding to the first designated point and the second image corresponding to the second designated point (FIG. 2, STEP 112). The details of an editing policy recognition method are described later. The image library generation unit 13 generates the image library associated with the travel route R by editing the first image and the second image according to the editing policy (FIG. 2, STEP 114).

On the contrary, if the second designated point contained in the range within the reference distance from the first designated point is determined not to be registered (FIG. 2, STEP 110 . . . NO), the editing policy recognition unit 12 recognizes an editing policy that adopts, as a target, only the first image corresponding to the first designated point (FIG. 2, STEP 116). The image library generation unit 13 generates the image library associated with the travel route R by editing the first image according to the editing policy (FIG. 2, STEP 118).

In the client 2, the information processing unit 25 determines whether a designation input has been made through the input device 23 or not (FIG. 2, STEP 222). For example, in a state where an application (application software) that is for viewing the image library and is installed in the client 2 is activated, an operation such as tapping of one or more buttons appearing on a screen according to the application is defined as the designation input. If the designation input is made (FIG. 2, STEP 222 . . . YES), a request for viewing the image library is transmitted by the client 2 to the information processing server 1 (FIG. 2, STEP 224 and an arrow X4). The request includes the identification information for identifying the client 2 or its user, one or more points registered in the database 10 in association with the identification information, and designation of the time point or travel.

According thereto, in the information processing server 1, the image library generation unit 13 transmits the image library according to the request to the client 2 (FIG. 2, STEP 120 or an arrow X5). In the client 2, the information processing unit 25 outputs the image library to the output device 24 (FIG. 2, STEP 226).

Figure 5A:
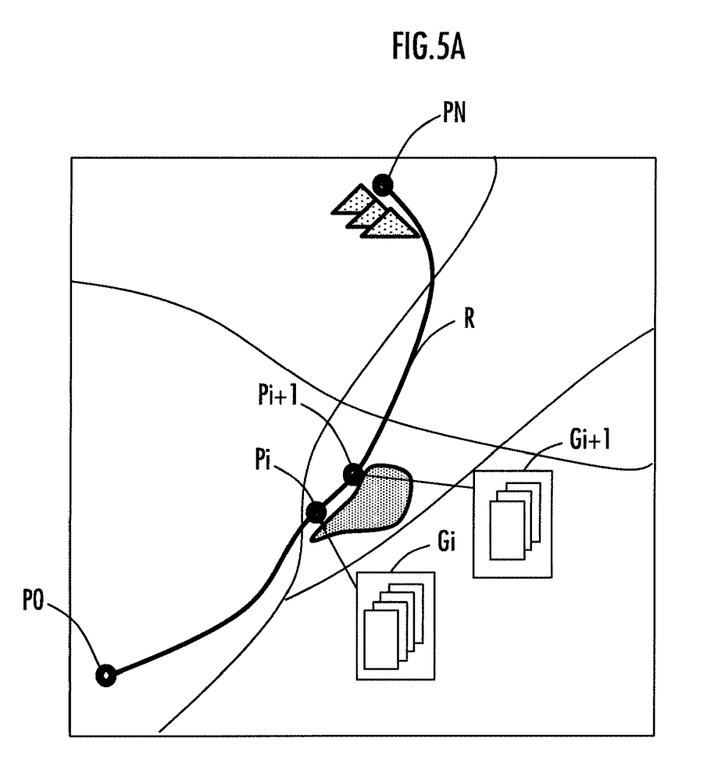
FIG. 5A is a diagram illustrating an output mode of an image library.
Figure 5B:
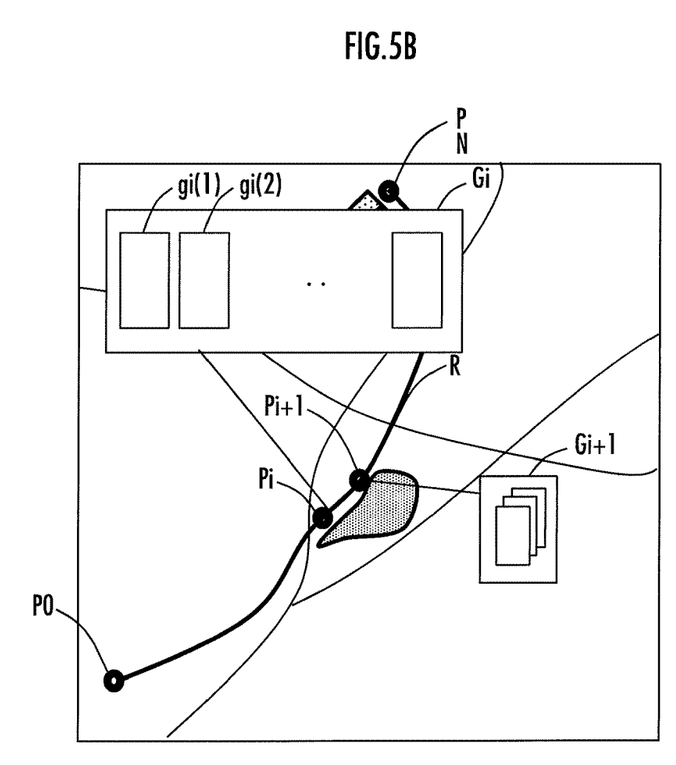
FIG. 5B is a diagram illustrating a developed mode of the output mode of the image library.

Accordingly, if the designated point is the presence point of the client 2 at the start time point of the ON period of the mobile station X, not only the travel route R and the first designated point $P_i$ (i=1, 2, . . . N) on this route but also a first image group $G_i$ corresponding to the first designated points $P_i$ are displayed on a navigation map on the output device 24, as shown in FIG. 5A, for example. The first image $G_i$ may be displayed through a designation operation, such as a tap or flick, to the position corresponding to the first designated point $P_i$. The designation operation, such as a tap or flick, to the position corresponding to the first image group $G_i$ displays the multiple first images $g_i(1)$, $g_i(2)$, . . . which constitute the first image group $G_i$ in an enlarged manner, as shown in FIG. 5B, for example. The arrangement order, size order, and data amount order of the first images $g_i(1)$, $g_i(2)$, . . . are defined according to the editing policy recognized by the editing policy recognition unit 12 in the information processing server 1, as described later. The data amount is reflected in the amounts of information, such as the image resolution, and the degree of colors of each of the pixels constituting the image.

Figure 6:
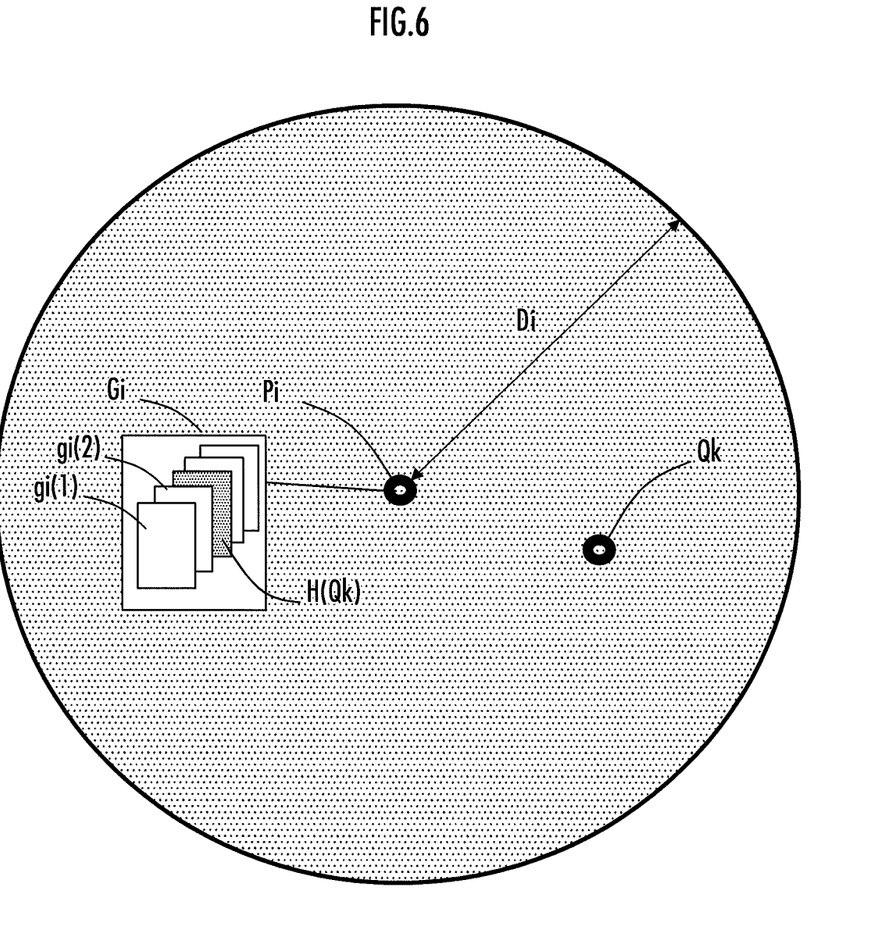
FIG. 6 is a diagram illustrating an output mode of the image library that includes a second image.

For example, as shown in FIG. 6, if the second designated point $H_k$ is present in a range within the reference distance from the first designated point $P_i$, the first image group $G_i$ includes not only the first images $g_i(1)$, $g_i(2)$, . . . but also the second images $H_k(1)$, . . . corresponding to the second designated point $H_k$. The arrangement order, the size magnitude order, the data amount order and the like of the first images $g_i(1)$, $g_i(2)$, . . . and the second images $H_k(1)$, . . . are also defined according to the editing policy.

Figure 7:
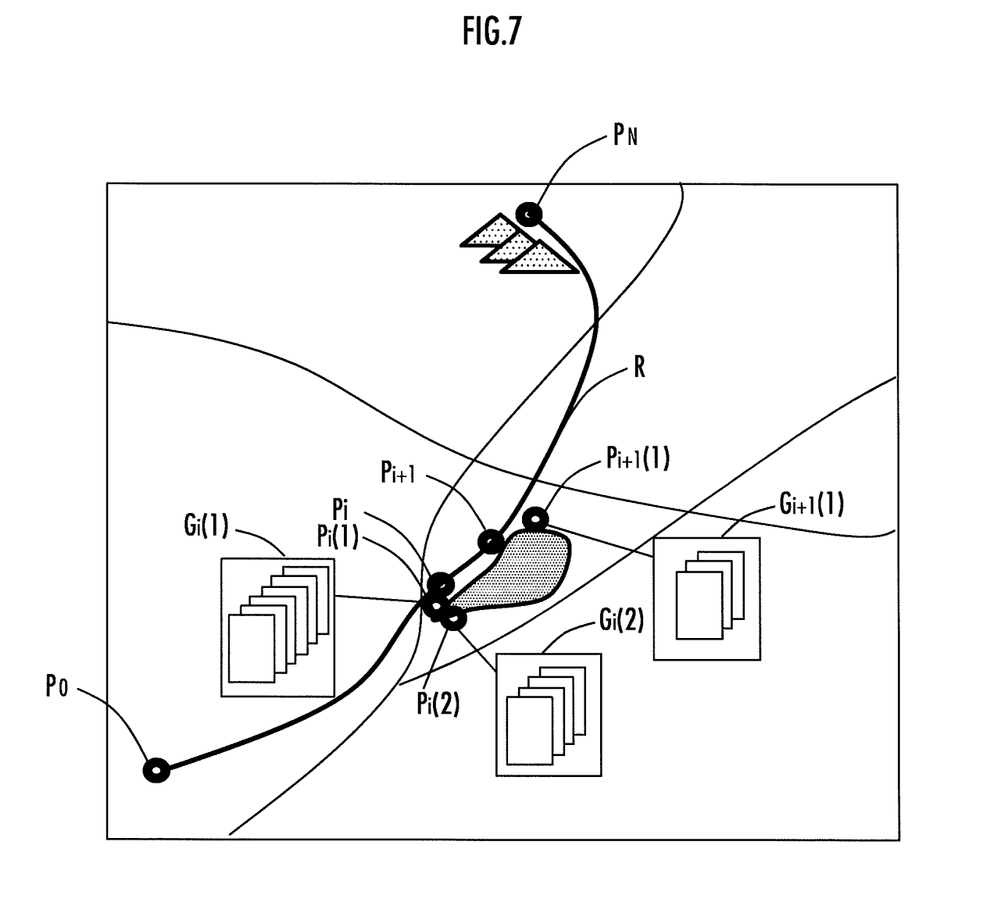
FIG. 7 is a diagram illustrating another output mode of the image library.

If the designated point is the imaging point of each image, not only peripheral points $P_i(1)$, $P_i(2)$, . . . around the presence point $P_i$ of the client 2 at the start time point in the ON period but also the first image group $G_i(1)$, $G_i(2)$, . . .

including the first images taken there are displayed on the output device 24, as shown in FIG. 7, for example.

Figure 8:
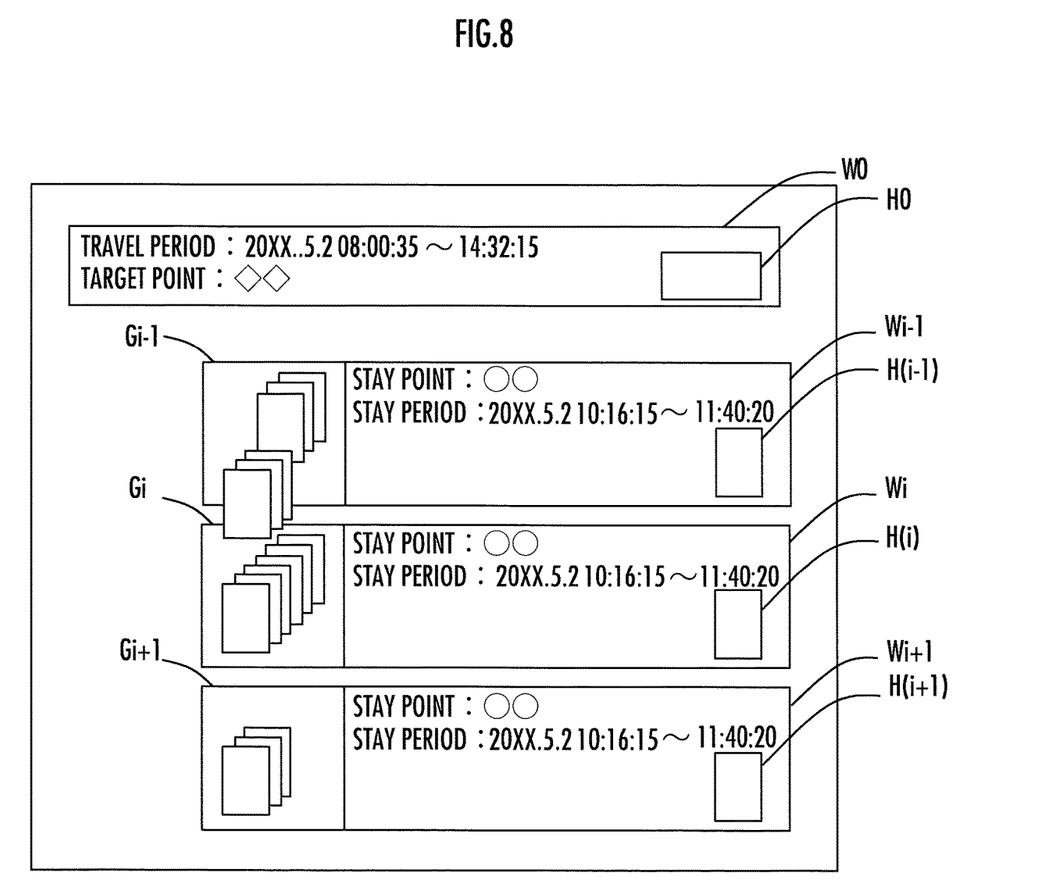
FIG. 8 is a diagram illustrating yet another output mode of the image library.

Furthermore, as shown in FIG. 8, for example, in a mode where multiple windows $W_0$ and $W_{i-1}$, $W_i$, $W_{i+1}$, . . . are included, the image library associated with the travel period or the travel route may be displayed on the output device 24. In the window $W_0$, not only a travel overview (travel period, target point (travel interval), companions, etc.) but also a typical image $H_0$ of the travel (may be designated by the user) are displayed. Besides the first image group $G_i$, not only the first designated points $P_i$ corresponding thereto or the stay modes therein (the first designated points $P_i$ or the names of facilities residing at the points, the latitudes and longitudes, a stay period, etc.) but also the typical image H(i) at the first designated point $P_i$ (e.g., besides the second designated image, the image designated by the user) are displayed in the window $W_i$.

(Editing Policy Recognition Method)

Hereinafter, the editing policy recognition method (see FIG. 2, STEP 112 and STEP 116) is described in detail.

First Embodiment

Figure 3A:
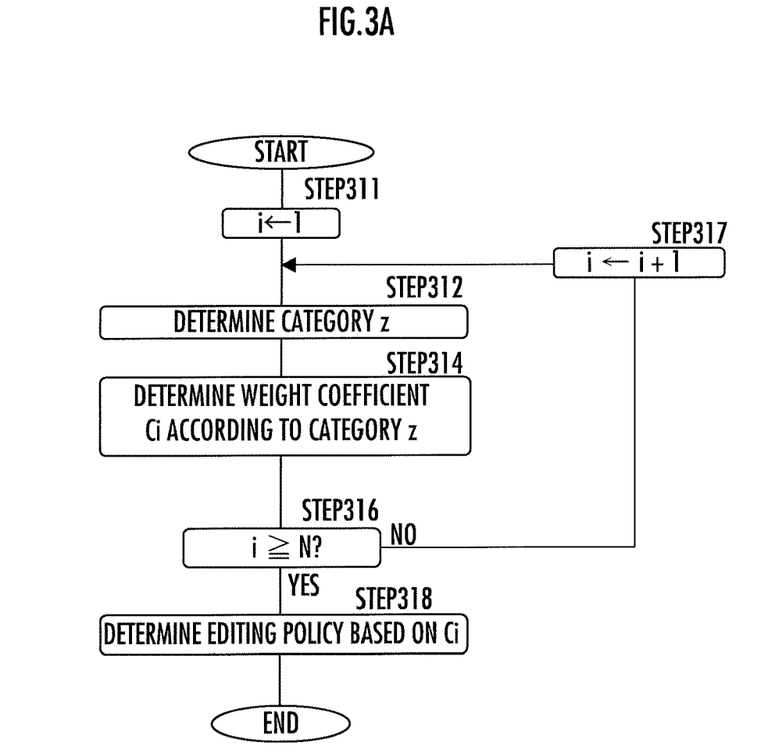
FIG. 3A is a diagram illustrating an editing policy recognition method (first embodiment)

An index i representing each image taken by the imaging device 21 in each travel period of the client 2 is set to "1" (FIG. 3A, STEP 311), and a category z of the object included in the image corresponding to the index i is determined (FIG. 3A, STEP 312). The image processing extracts characteristic outlines of the object, and determines the category z of the object through matching between the outlines and multiple patterns. The category z may be designated by the user on an image-by-image basis through the input device 23 in the client 2.

A weight coefficient Ci is determined according to the category z of the object (FIG. 3A, STEP 314). For example, a table that describes the correlation relationship between the category z and the weight coefficient Ci is used to determine the weight coefficient Ci. If the category z of the object is "person", the weight coefficient Ci may be set to a larger value than that in the case where the category z of the object is "an object other than a person". If the category z of the object is "person", the larger the number of people as objects included in the image is, the larger the weight coefficient Ci may be set.

Subsequently, it is determined whether the index i becomes at least the total number N of images in the travel period or not (FIG. 3A, STEP 316). If the determination result is negative (FIG. 3A, STEP 316 . . . NO), the index i is incremented by "1" (FIG. 3A, STEP 317) and the processes of determining the category z of the object included in the image corresponding to the index i and thereafter are executed (see FIG. 3A, STEP 312). On the contrary, if the determination result is affirmative (FIG. 3A, STEP 316 . . . YES), the editing policy is determined on the basis of the weight coefficient Ci (FIG. 3A, STEP 318).

For example, the editing policy, such as of determination of (a) the arrangement order or arrangement mode, (b) the magnitude of the size, or (c) the data amount order, of the images is determined according to the magnitude of the weight coefficient Ci of each image in the travel period. The editing policy, such as of determination of (a) the arrangement order or arrangement mode, (b) the magnitude of the size, or (c) the data amount order, of the images may be determined according to the magnitude order of the total ΣCi of the weight coefficients Ci of the images in each travel period.

Second Embodiment

Figure 3B:
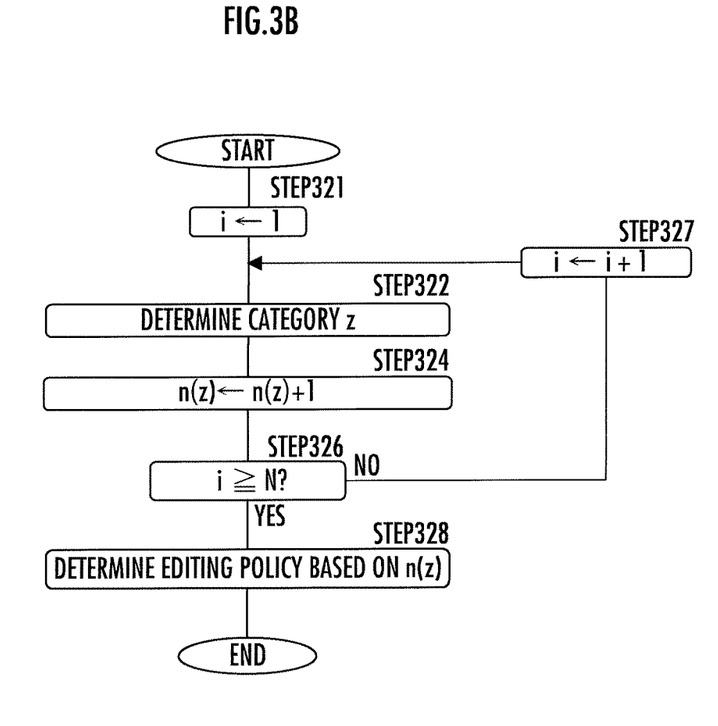
FIG. 3B is a diagram illustrating an editing policy recognition method (second embodiment)

An index i representing each image taken by the imaging device 21 in each travel period of the client 2 is set to "1" (FIG. 3B, STEP 321), and the category z of the object included in the image corresponding to the index i is determined (FIG. 3B, STEP 322). The number n(z) of images classified into the category z of the object is incremented by "1" (FIG. 3B, STEP 324). Subsequently, it is determined whether the index i becomes at least the total number N of images in the travel period or not (FIG. 3B, STEP 326). If the determination result is negative (FIG. 3B, STEP 326 . . . NO), the index i is incremented by "1" (FIG. 3B, STEP 327) and the processes of determining the category z of the object included in the image corresponding to the index i and thereafter are executed (see FIG. 3B, STEP 322). On the contrary, if the determination result is affirmative (FIG. 3B, STEP 326 . . . YES), the editing policy is determined on the basis of the number n(z) of images classified into each category z (FIG. 3B, STEP 328).

For example, the editing policy, such as of determination of (a) the arrangement order or arrangement mode, (b) the magnitude of the size, or (c) the data amount order, of the images classified on a category z-by-category z basis is determined according to the size magnitude order of n(z).

Third Embodiment

The editing policy designated in the client 2 is transmitted to the information processing server 1 and then is registered in the database 10. The editing policy recognition unit 12 recognizes or reads the registered editing policy as the editing policy of the image uploaded from the client 2.

(Working Effects)

The information processing server 1, the client 2, and the information processing system including these server and client register the image taken by the client 2 into the storing device 20 of the client 2 according to the start of OFF period of the mobile station X (ON→OFF switching of the mobile station X) whose communication with the client 2 is established (see FIG. 2, STEP 216→STEP 218→STEP 220). Subsequently, according to the start of the ON period of the mobile station X (OFF→ON switching of the mobile station X), the registered taken image is transmitted from the client 2 to the information processing server 1 and then is registered in the database 10 (see FIG. 2, STEP 202→STEP 204→STEP 206→ . . . →STEP 104).

The image taken in the travel period of the client 2 and registered in the database of the information processing server is edited according to the editing policy, thereby generating "image library" in the travel period (see FIG. 2, STEP 106→ . . . →STEP 112→STEP 114 or STEP 106→ . . . →STEP 116→STEP 118). The image library is output through the client 2 or another terminal (see FIG. 2, STEP 222→STEP 224→STEP 120→STEP 116). The "editing policy" is determined on the basis of the image stored and held in the database 10, or is designated through the client 2 (see FIGS. 3A and 3B). Consequently, the image library is generated in a form conforming to the user's preference reflected indirectly in the group of images taken in the travel period by the user using the imaging device 21 of the client 2, or the user's preference reflected directly in the content designated through the client 2 by the user. Accordingly, in a scene where events in the travel period are reviewed, improvement in the usability of the image library for the user is facilitated (see FIGS. 5, 7 and 8).

In response to the start of the ON period of the mobile station X, the registered taken image and "designated point" are associated with each other, and are transmitted to the information processing server 1 (see FIG. 2, STEP 202→STEP 204→STEP 206 and the arrow X1). The "designated point" is the imaging point of each image, or the presence point of the client 2 at the end time point of the last ON period of the mobile station X or at the start time point of the ON period this time. That is, the point is a point having a high probability that the user of the client 2 or the mobile station X stops by or stays. The image corresponding to "first designated point" that is the designated point departing from "location area" specific to the client 2 is registered as "first image" in the information processing server 1 (see FIG. 2, STEP 102→STEP 104).

The images are taken in the travel period of the client 2, and "image library" in the travel period is generated on the basis of the multiple first images registered in the database 10 of the information processing server 1 (see FIG. 2, STEP 112→STEP 114 and STEP 116→STEP 118). The image library is generated in association with the travel route R defined on the basis of the time series of the position of the client 2 in the travel period from setting of the target point to the client 2 reaching the target point (see FIGS. 5A and 5B). At least one of "second designated point" and "second image" is designated in the client 2, and the image library is generated on the basis of the second image $H_k$ corresponding to the second designated point $Q_k$ included in the range within the reference distance from the first designated point $P_i$ with respect to the client 2 (see FIG. 6).

An area including a point where the user usually or frequently stops by is designated as the location area. More specifically, the first location area including the point where the travel frequency of the mobile station X is equal to or higher than the first threshold, and the second location area including the point where the stay frequency of the mobile station X is equal to or higher than the second threshold are set as the location areas on the basis of the probe information of the mobile station X (see FIG. 4, S(Q0), S(Q1), S(Q2), S(R1) and S(R2)). Accordingly, the position where the user unusually or incidentally stops by is registered as the designated point (see FIG. 4, CP2 and CP3).

The first location area is set smaller than the second location area. For example, in FIG. 4, the width $W_i$ of the first location area S(Ri) (i=1, 2) is set smaller than the diameter Dj of the second location area S(Qj) (j=0, 1, 2). Accordingly, the narrow location area is more explicitly actualized in the case where the user's travel frequency is high than in the case where the user's stay frequency is high at a certain point. Consequently, in a case where the user stops by a point where the user usually passes but incidentally stops by a point slightly deviating therefrom (see FIG. 4, CP2), the possibility that the point where the user stops by is excluded from the designated point can be reduced.

As a result thereof, the image library is generated on the basis of the image (first image) taken through the client 2 at the stay point (first designated point) or stay area that is unusual or incidental for the user (see FIGS. 5A, 5B and 6 to 8). Accordingly, in a scene where the user is to be reminded of an unusual or incidental stay history, improvement in the usability of the image library for the user is facilitated.

Another Embodiment of Present Invention

In a case where the target point is set in the client 2, a route guide to the target point is executed by the information processing server 1. More specifically, when the image library generation unit 13 receives the target point from the client 2, one or more server routes R(1) made up of a group of links connecting the current point or the departure point to the target point is retrieved. For the retrieval of the server route R(1), server map information and the travel cost for each link are used. The route having the minimum total travel cost is retrieved as the server route R(1).

The image library generation unit 13 generates server route information that represents the server route R(1), and transmits the information to the client 2. The "server route information" includes link identification information on at least a part of a series of groups of links that constitute the server route R(1), or the coordinate values of discrete points on the server route R(1).

In the client 2, the information processing unit 25 receives the server route information. The information processing unit 25 calculates the client route R(1) that connects the departure point or the current point to the target point using the client map information on the basis of the server route information, and outputs the route to the output device 24.

For example, the client route R(1) is retrieved so as to contain multiple points represented by the link identified by the link identification information included in the server route information or the coordinate values (to reconstruct at least a part of the server route R(1)). Accordingly, the client route R(1) is overlapped with the client map and displayed on a display constituting the output device 24.

What is claimed is:

1. An information processing server, comprising:
   one or more memory devices;
   one or more processors that execute one or more operation processes;
   a database stored on the one or more memory devices;
   an image registration unit configured to obtain an image taken by a client having a function of communicating with a mobile station and registered in the client in response to a start of an OFF period of the mobile station, the image being obtained in response to a start of an ON period of the mobile station immediately after the OFF period, and to cause the database to store the image;
   an editing policy recognition unit configured to determine an editing policy, based on an image taken through the client in a travel period of the client and stored in the database, or to recognize an editing policy designated through the client; and
   an image library generation unit configured to generate an image library in the travel period by editing the image taken through the client in the travel period of the client and stored in the database, according to the editing policy obtained by the editing policy recognition unit.

2. The information processing server according to claim 1,
   wherein the editing policy recognition unit recognizes a category of the image, based on an object of the image stored in the database, determines a weight coefficient of the image according to the category, and recognizes the editing policy according to a value of the weight coefficient or a total value of the weight coefficient in the travel period.

3. The information processing server according to claim 1,
   wherein the editing policy recognition unit recognizes a category of the image, based on an object of the image stored in the database, and recognizes the editing policy according to a number of images of every category in the travel period of the client.

4. The information processing server according to claim 1,
wherein the image library generation unit recognizes a travel route in the travel period, based on a time series of positions of the client, and generates the image library associated with the travel route.

5. The information processing server according to claim 1,
wherein the image registration unit obtains the image associated with a client's imaging point of the image, or with a client's presence point at an end time point of a last ON period of the mobile station or a start time point of a present ON period, and causes the database to store selectively the image associated with the point on a condition that the point deviates from a location area specific to the client.

6. The information processing server according to claim 1,
wherein the image registration unit causes the database to store the image designated by the client, and
the image library generation unit generates the image library, based on the image taken through the client in the travel period and also on the image designated by the client.

7. A client device, comprising: one or more memory devices; one or more processors that execute one or more operation processes; an imaging device; a storing device; an input device; an output device; and an information processing unit, the client device having a function of communicating with each of a mobile station and an information processing server,
wherein the information processing unit registers an image taken by the imaging device in the storing device in response to a start of an OFF period of the mobile station, and causes the information processing server to register the image registered in the storing device in response to a start of an ON period of the mobile station subsequent to the OFF period, and
the output device displays an image library that is generated by editing the image registered in the information processing server and is in a travel period of the client device.

8. The client device according to claim 7,
wherein the information processing unit causes the information processing server to recognize a time series of positions of the client device, and
the output device outputs the image library generated by the information processing server in association with a travel route in the travel period determined based on the time series of the positions of the client device.

9. The client device according to claim 7,
wherein the information processing unit registers, in the storing device, the image in association with an imaging point of the image, or with a presence point at an end time point of a last ON period of the mobile station or a start time point of an present ON period, and causes the information processing server to register selectively the image associated with the point on a condition that the point associated with the image deviates from a location area specific to the client device.

10. The client device according to claim 7,
wherein the information processing unit causes the information processing server to register the image designated through the input device, and the output device outputs the image library generated in the information processing server based on the image taken through the imaging device in the travel period of the client device and also on the image designated through the input device.

11. An information processing system, comprising: an information processing server; and a client device,
wherein the information processing server comprises:
one or more memory devices;
one or more processors that execute one or more operation processes;
a database stored on the one or more memory devices;
an image registration unit configured to obtain an image taken by a client device having a function of communicating with a mobile station and registered in the client device in response to a start of an OFF period of the mobile station, the image being obtained in response to a start of an ON period of the mobile station immediately after the OFF period, and to cause the database to store the image;
an editing policy recognition unit configured to determine an editing policy, based on an image taken through the client device in a travel period of the client device and stored in the database, or to recognize an editing policy designated through the client device; and
an image library generation unit configured to generate an image library in the travel period by editing the image taken through the client device in the travel period of the client device and stored in the database, according to the editing policy obtained by the editing policy recognition unit,
the client device comprises: one or more other memory devices; one or more other processors that execute one or more other operation processes; an imaging device; a storing device; an input device; an output device; and an information processing unit, the client device having a function of communicating with each of the mobile station and the information processing server,
wherein the information processing unit registers the image taken by the imaging device in the storing device in response to the start of the OFF period of the mobile station, and causes the information processing server to register the image registered in the storing device in response to the start of the ON period of the mobile station subsequent to the OFF period, and
the output device displays an image library that is generated by editing the image registered in the information processing server and is in the travel period of the client device.

12. An information processing server, comprising:
one or more memory devices;
one or more processors that execute one or more operation processes;
a database stored on the one or more memory devices;
an image registration unit configured to obtain an image taken by a client having a function of communicating with a mobile station and registered in the client in response to a start of an OFF period of the mobile station, the image being obtained in response to a start of an ON period of the mobile station immediately after the OFF period, and to cause the database to store the image;
an editing policy recognition unit configured to recognize a category of the image, based on an object of the image stored in the database, determines a weight coefficient of the image according to the category or a total value of the weight coefficient in the travel period, or a number of images of every category in the travel period of the client; and an image library generation unit configured to generate an image library in the travel period by editing the image taken through the client in the travel period of the client and stored in the database, according to the weight coefficient or total value of the weight coefficient in the travel period, or the number of images of every category in the travel period of the client obtained by the editing policy recognition unit, wherein the image registration unit obtains the image associated with a client's imaging point of the image, or with a client's presence point at an end time point of a last ON period of the mobile station or a start time point of a present ON period, and causes the database to store selectively the image associated with the point on a condition that the point deviates from a location area specific to the client.

\* \* \* \* \*